United States Patent
Zhu et al.

(10) Patent No.: US 11,483,744 B2
(45) Date of Patent: Oct. 25, 2022

(54) METHODS AND COMPUTING DEVICE FOR SPLITTING TRAFFIC ACROSS MULTIPLE ACCESSES

(71) Applicant: ZTE Corporation, Guangdong (CN)

(72) Inventors: Jinguo Zhu, Guangdong (CN); Xingyue Zhou, Guangdong (CN); Fei Lu, Guangdong (CN); Shuang Liang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 66 days.

(21) Appl. No.: 16/938,013

(22) Filed: Jul. 24, 2020

(65) Prior Publication Data

US 2020/0359274 A1    Nov. 12, 2020

Related U.S. Application Data (63) Continuation of application No. PCT/CN2018/073942, filed on Jan. 24, 2018.

(51) Int. Cl.
*H04W 4/00* (2018.01)
*H04W 36/00* (2009.01)
(Continued)

(52) U.S. Cl.
CPC ......... *H04W 36/0044* (2013.01); *H04W 8/06* (2013.01); *H04W 36/14* (2013.01); *H04W 84/042* (2013.01)

(58) Field of Classification Search
CPC ... H04W 36/0044; H04W 8/06; H04W 36/14; H04W 84/042; H04W 76/16;
(Continued)

(56) References Cited

U.S. PATENT DOCUMENTS 9,814,029 B2    11/2017    Futaki et al.
9,986,462 B2    5/2018    He
(Continued)

FOREIGN PATENT DOCUMENTS

CN    104105221 A    10/2014
CN    104704901 A    6/2015
(Continued)

OTHER PUBLICATIONS

International Search Report and Written Opinion in International Application No. PCT/CN2018/073942, dated Nov. 1, 2018, 9 pages.
(Continued)

*Primary Examiner* — Marcos Batista
(74) *Attorney, Agent, or Firm* — Perkins Coie LLP (57) ABSTRACT

A wireless communication method is provided to comprise: receiving, by a first computing device, a notification that a wireless communication device that has previously established a protocol data unit session via a first network access has registered for a second network access; and establishing, by the first computing device, one or more quality of service (QoS) flows for the protocol data unit session for the wireless communication device over the second network access by transmitting, to a second computing device, a message that includes information to associate the one or more quality of service (QoS) flows with the second network access, and wherein the first computing device is configured to carry out a session management function and the second computing device is configured to carry out an access and mobility management function.

16 Claims, 8 Drawing Sheets

(51) Int. Cl.
    *H04W 8/06* (2009.01)
    *H04W 36/14* (2009.01)
    *H04W 84/04* (2009.01)

(58) Field of Classification Search
    CPC ............. H04W 28/0226; H04W 40/36; H04W 28/0268; H04W 28/0252; H04W 60/005; H04W 88/06
    USPC .......................................... 370/331; 455/312
    See application file for complete search history.

(56) References Cited

U.S. PATENT DOCUMENTS

| | | | |
|---|---|---|---|
| 2017/0289046 A1* | 10/2017 | Faccin | H04L 47/20 |
| 2020/0305211 A1* | 9/2020 | Foti | H04L 65/1016 |

FOREIGN PATENT DOCUMENTS

| | | | |
|---|---|---|---|
| CN | 105075387 A | 11/2015 | |
| CN | 107404736 A | 11/2017 | |
| WO | 2014129870 A1 | 8/2014 | |
| WO | 2017190640 A1 | 11/2017 | |
| WO | 2017196386 A1 | 11/2017 | |

OTHER PUBLICATIONS

3GPP. "Evolved Universal Terrestrial Radio Access (E-UTRA) and NR; Multi-connectivity; Stag 2" TS 37.340, v 15.0.0, Jan. 4, 2018 (Jan. 4, 2018), 51 pages.

3GPP. "NR;NR and NG-RAN Overall Description; Stage 2" TS 38.300, v 15.0.0, Jan. 4, 2018 (Jan. 4, 2018), 59 pages.

Extended European Search Report in EP Patent Application No. 18902006.8, dated Aug. 5, 2021, 12 pages.

ZTE: "TS 23.502 Clarification on handover between 3GPP and non 3GPP", 3GPP Draft; S2-177096 TS23.502 Clarification on Handover Between 3GPP and Non 3GPP -, 3rd Generation Partnership Project (3GPP), Mobile Competence Centre; 650, Route Des Lucioles ; F-06921 Sophia-Ant vol. SA WG2, No. Ljubljana, Slovenia; Oct. 23, 2017-Oct. 27, 2017 Oct. 22, 2017 (Oct. 22, 2017), XP051347052, Retrieved from the Internet: URL:http://www.3gpp.org/ftp/Meetings_3GPP_SYNC/SA2/Docs/[retrieved on Oct. 22, 2017].

"3rd Generation Partnership Project; Technical Specification Group Services and System Aspects; Procedures for the 5G System; Stage 2 (Release 15)", 3GPP Standard; Technical Specification; 3GPP TS 23.502, 3rd Generation Partnership Project (3GPP), Mobile Competence Centre; 650, Route Des Lucioles ; F-06921 Sophia-Antipolis Cedex; France, vol. SA WG2, No. VI5.0.0, Dec. 22, 2017 (Dec. 22, 2017), pp. 1-258, XP051392102, [retrieved on Dec. 22, 2017].

Huawei, "TS23.502: Clarification about QoS flow management in PDU session related procedures," SA WG2 Meeting #124, S2-179373, Nov. 27-Dec. 1, 2017, Reno, Nevada, USA, 34 pages.

* cited by examiner

METHODS AND COMPUTING DEVICE FOR SPLITTING TRAFFIC ACROSS MULTIPLE ACCESSES

CROSS-REFERENCE TO RELATED APPLICATION(S)

This patent document is a continuation of and claims priority to International Patent Application No. PCT/CN2018/073942, filed Jan. 24, 2018, the entire contents of which is incorporated by reference as part of the disclosure of this application.

TECHNICAL FIELD

The present disclosure is related generally to wireless networks and, more particularly, to methods and a computing device for splitting traffic across multiple accesses.

BACKGROUND

In currently proposed wireless communication schemes, each protocol data unit session is associated with a single access. Thus, for example, a wireless communication device is not permitted to carry out a protocol data unit session on both a first access (such as a fourth generation ("4G") access) and a second access (such as a fifth generation ("5G") access). This limits the ability of wireless networks to appropriately allocated bandwidth for different types of communication.

SUMMARY

This document relates to methods, systems, and devices for wireless communication schemes.

In one aspect, a wireless communication method is provided to comprise: receiving, by a first computing device, a notification that a wireless communication device that has previously established a protocol data unit session via a first network access has registered for a second network access; and establishing, by the first computing device, one or more quality of service (QoS) flows for the protocol data unit session for the wireless communication device over the second network access by transmitting, to a second computing device, a message that includes information to associate the one or more quality of service (QoS) flows with the second network access, and wherein the first computing device is configured to carry out a session management function and the second computing device is configured to carry out an access and mobility management function.

In another aspect, a wireless communication method is provided to comprise: receiving, by a first computing device, a notification that a wireless communication device that has previously established a protocol data unit session via a first network access has registered for a second network access; modifying, by the first computing device, one or more quality of service (QoS) flows for the protocol data unit session to associate the one or more quality of service (QoS) flows with the second network access by transmitting, to a second computing device, a message that includes information to associate the one or more quality of service (QoS) flows with the second network access, wherein the first computing device is configured to carry out a session management function and the second computing device is configured to carry out an access and mobility management function.

In another aspect, a wireless communication method carried out by a wireless communication device is provided. The method comprises: establishing a protocol data unit session over a first network access; registering for a second network access; receiving quality of service (QoS) information for the second network access via the first network access; and transmitting an uplink data traffic via the second network access using the received quality of service (QoS) information.

The above and other aspects and their implementations are described in greater detail in the drawings, the descriptions, and the claims.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

The disclosure is generally directed a method and computing device for splitting traffic across multiple accesses. In particular, the disclosure describes various methods and devices for establishing a PDU session supporting multiple accesses.

According to an embodiment, in a communication network in which a wireless communication device has established a protocol data unit session via a first network access, a first computing device: receives a notification that the wireless communication device has registered for a second network access, establishing one or more new quality of service flows for a protocol data unit session for the wireless communication device over the second network access. The first computing device establishes the one or more new quality of service flows by transmitting, to a second computing device, a message that includes information associating the new one or more quality of service flows with the second access. The first computing device may carry out a session management function and the second computing device may carry out an access and mobility management function.

In an embodiment, receiving the notification that the wireless communication device has registered for the second network access involves the first computing device receiving the notification from the second computing device.

According to an embodiment, receiving the notification that the wireless communication device has registered for the second network access involves the first computing device receiving the notification from a third computing device via the second computing device, wherein the session management function carried out by the first computing device is a home session management function and the third computing device carries out a visiting session management function.

In an embodiment, transmitting, to the second computing device, a message that includes information associating the one or more new quality of service flows with the second access involves transmitting the message to the second computing device via a third computing device, wherein the session management function carried out by the first computing device is a home session management function and the third computing device carries out a visiting session management function.

According to an embodiment, the first computing device carries out further actions including determining, based on a policy control function, that at least one of the new quality of service flows should be on the second access.

In an embodiment, the first computing device carries out further actions including determining, without reference to a policy control function, that at least one of the new quality of service flows should be on the second access.

According to an embodiment, the first access is via a first type of access technology (such as a cellular network) and the second access is via a second type of access technology (such as a wireless local area network).

In an embodiment, in a communication network in which a wireless communication device has established a protocol data unit session via a first network access, a first computing device: receives a notification that the wireless communication device has registered for a second network access, and modifies one or more quality of service flows for the established protocol data unit session to associate the one or more quality of service flows with the second network access. The first computing device modifies the one or more quality of service flows by transmitting, to a second computing device, a message that includes information associating the one or more quality of service flows with the second access. The first computing device may carry out a session management function and the second computing device may carry out an access and mobility management function.

According to an embodiment, receiving the notification that the wireless communication device has registered for the second network access comprises the first computing device receiving the notification from the second computing device.

In an embodiment, the message includes information regarding the type of access that the one or more quality of service information flows are to be associated with.

According to an embodiment, the first computing device notifies the wireless communication device regarding the type of access that the one or more quality of service flows are to be associated with.

In an embodiment, the first access is via a first type of access technology (such as a cellular network) and the second access is via a second type of access technology (such as a wireless local area network).

According to an embodiment, a wireless communication device: establishes a protocol data unit session over a first access, registers for a second access, receives quality of service rules for the second access via the first access, and transmits uplink data traffic via the second access using the received quality of service rules.

In an embodiment, receiving quality of service rules involves receiving quality of service rules from a computing device carrying out a session management function.

According to an embodiment, the message is received from the computing device carrying out a session management function via a second computing device that carries out an access management function.

In an embodiment, the first access is via a first type of access technology (such as a cellular network) and the second access is via a second type of access technology (such as a wireless local area network).

Figure 1:
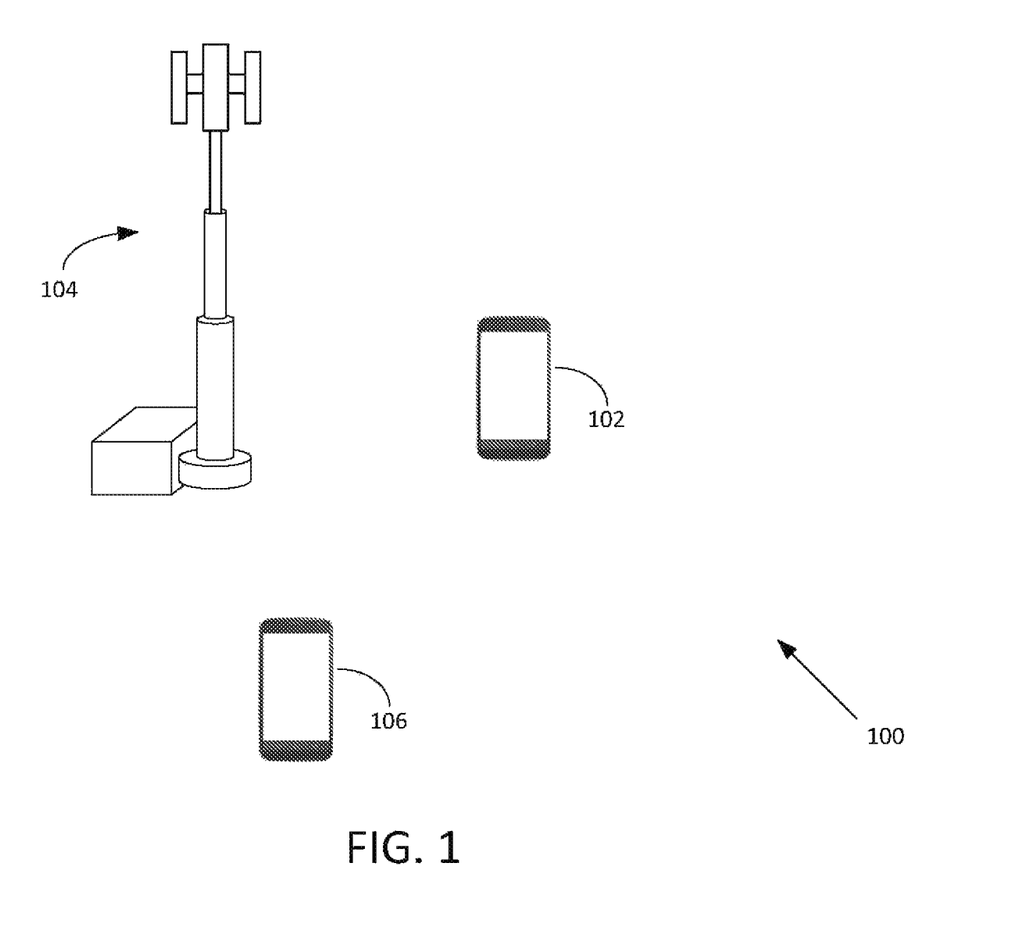
FIG. 1 is a diagram of a system in which various embodiments of the disclosure are implemented.

FIG. 1 depicts a communication system 100 in which the various embodiments described herein may be implemented. The communication system 100 includes several wireless communication devices ("wireless communication device" will sometimes be shortened herein to "communication device" or "device" for convenient reference). The communication devices depicted are a first communication device 102 (depicted as a user equipment ("UE")), a second communication device 104 (depicted as a base station), and a third communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other base stations, other UEs, wireless infrastructure, wired infrastructure, and other devices commonly found in wireless networks. Possible implementations of the communication devices include any device capable of wireless communication, such as a smartphone, tablet, laptop computer, and non-traditional devices (e.g., household appliances or other parts of the "Internet of Things"). When operating as part of a wireless communication system, a wireless communication device may be referred to as a "wireless network node." A wireless communication device communicates primarily by transmitting and receiving wireless signals.

Figure 2:
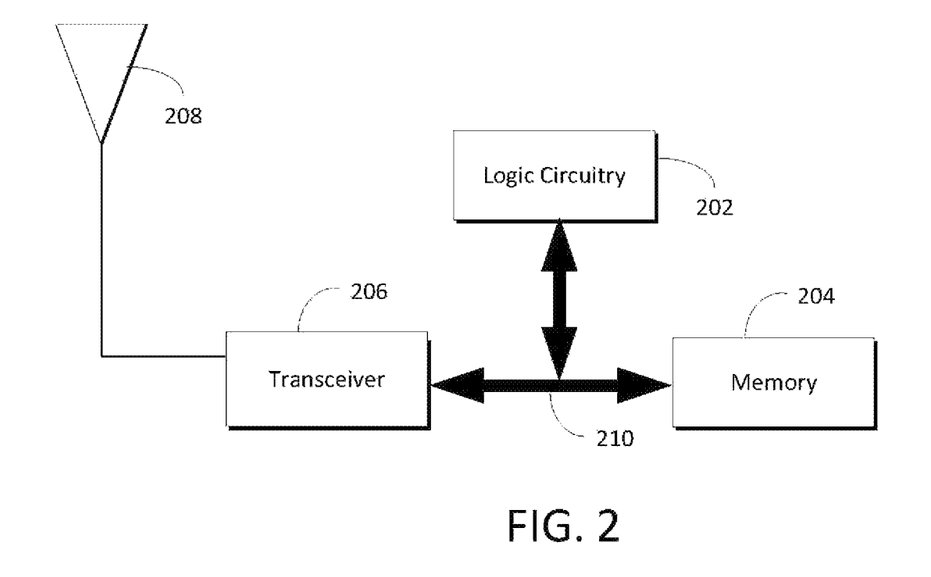
FIG. 2 shows an example hardware architecture of a communication device.

FIG. 2 illustrates a basic hardware architecture implemented by each of the wireless communication devices of FIG. 1, according to an embodiment. The elements of FIG. 1 may have other components as well. The hardware architecture depicted in FIG. 2 includes logic circuitry 202, memory 204, transceiver 206, and one or more antennas represented by antenna 208 (including transmit antennas and/or receive antennas). The memory 204 may be or include a buffer that, for example, holds incoming transmissions until the logic circuitry is able to process the transmission. Each of these elements is communicatively linked to one another via one or more data pathways 210. Examples of data pathways include wires, conductive pathways on a microchip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Figure 3:
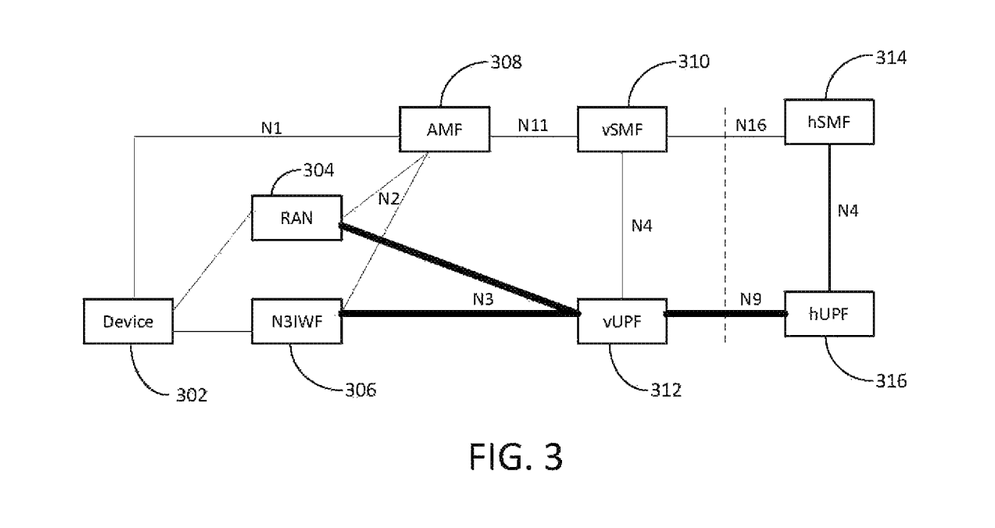
FIG. 3 depicts a network architecture in which various embodiments may be used.

FIG. 3 illustrates an architecture for a mobile communication system ("system") 300 in which the various embodiments described herein may be used. The elements depicted in FIG. 3 are often referred to herein as "functions." However, it is to be understood that these functions are, in fact, carried out by actual computing devices (e.g., under the control of software), and that any given "function" (such as an access management function) is (according to an embodiment) an actual computing device (with the architecture depicted in FIG. 2) operating within a network (such as a core network of a mobile communication system).

The system 300 includes a representative user equipment ("UE") 302 (also referred to as a "wireless communication device," "communication device," or "device" for convenient reference), a radio access network ("RAN") 304 (e.g., a third generation partnership project ("3GPP") radio access network) that operates according to a communication standard, an interworking function (such as a Non-3GPP Inter-Working Function or "N3IWF") 306, an access and mobility management function ("AMF") 308, a visited session management function ("vSMF") 310, a visited user plane function ("vUPF") 312, a home session management function ("hSMF") 314, and a home user plane function ("hUPF") 316.

The interworking function 306 is used for untrusted (e.g., non-3GPP) access. The interworking function supports Internet Protocol security ("IPsec") tunnel establishment with the device 302. Different IPsec tunnels are used to deliver the control plane signalling and user plane data. The interworking function 306 also supports relay uplink and downlink control-plane non-access stratum ("NAS") (N1) signalling between the device 302 and the AMF 308, and handles N2 signalling from the SMF (relayed by AMF 308) related to protocol data unit ("PDU") sessions and quality of service ("QoS").

The AMF 308 carries out the following functions: registration management, connection management, reachability management, and mobility management. The AMF 308 also performs access authentication and access authorization. The AMF 308 is the NAS security termination and relays the session management ("SM") NAS between the device 302 and the SMF, etc.

Each of the SMFs in FIG. 3 (vSMF 310 and hSMF 314 carries out the following functions: session establishment, modification and release, UE internet protocol ("IP") address allocation & management (including optional authorization functions), selection and control of user plane ("UP") functions, downlink data notification, etc. In the home routed case, there is one vSMF in the Visited Public Land Mobile Network ("VPLMN") and one hSMF in the Home Public Land Mobile Network ("HPLMN"). The HPLMN is the Public Land Mobile Network ("PLMN") in which the profile of the subscriber using the device 302 is held. If the device 302 roams to other networks, the subscription information will be provided from the HPLMN. A VPLMN is a PLMN to which the device 302 has roamed after leaving the HPLMN.

A UPF (such as the vUPF 312 or the hUPF 316) carries out the following functions: serving as an anchor point for intra-/inter-radio access technology ("RAT") mobility, packet routing and forwarding, traffic usage reporting, QoS handling for the user plane, downlink packet buffering, and downlink data notification triggering, etc. In the home routed case, there is one vUPF in the VPLMN and one hUPF in the HPLMN.

Figure 4:
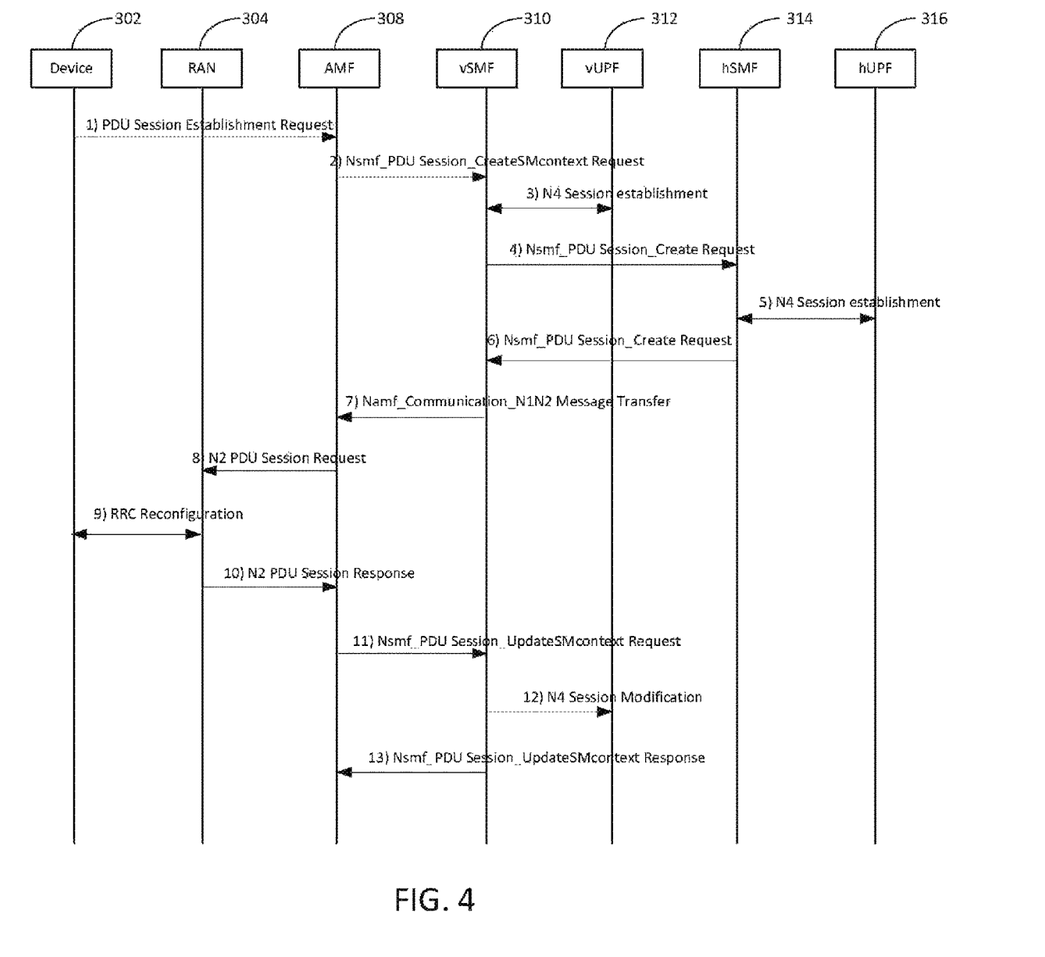
FIG. 4 depicts an existing procedure for establishing a protocol data unit session.

Turning to FIG. 4, an existing procedure for establishing a PDU session will now be described. This procedure can be used for either 3GPP access or non 3GPP access. Note that the RAN 304 can alternatively be non-radio access network.

1) When the device 302 needs to establish a new PDU session, the device 302 sends an N1 NAS message PDU Session Establishment Request to the AMF 308 via the RAN (or via some other access network). This message includes the PDU session ID, the Data Network Name ("DNN"), and the PDU session type (indicating IPv4 or IPv6).

2) The AMF 308 determines that the message corresponds to a request for a new PDU Session and selects an SMF based on the requested DNN. When the PDU session is home routed, the AMF selects both the vSMF in the VPLMN and the hSMF in HPLMN (vSMF 310 and hSMF 314 in this example). After SMF selection, the AMF 308 sends an Nsmf_PDUSession_CreateSMContext Request message to the vSMF 310. This message includes the NAS SM message received from device 302.

3) The vSMF 310 performs an N4 Session Establishment procedure with the vUPF 312 and provides packet detection, enforcement and reporting rules to be installed on the vUPF 312 for this PDU Session. The vUPF 310 may respond with the vUPF N9 tunnel information and the N3 tunnel information to vSMF.

4) For the home routed case, the vSMF 310 sends a Nsmf_PDUSession_Create Request message to the hSMF 314. This message includes Session Management information received from AMF 308 and the vUPF N9 tunnel information of this PDU session.

5) The hSMF 314 carries out an N4 Session Establishment procedure with the hUPF 316 and provides packet detection, enforcement and reporting rules to be installed on the hUPF 316 for this PDU Session. The hUPF 316 may respond with the hUPF N9 tunnel information to hSMF 316.

6) The hSMF 314 may contact the Policy Control Function ("PCF") to retrieve the QoS policy of this PDU session. The hSMF 314 then sends a Nsmf_PDUSession_Create Response message to the vSMF 310. This message includes QoS information of the QoS flows of this PDU session and the home core network ("H-CN") tunnel information.

7) The vSMF 310 sends a Namf_Communication_N1N2MessageTransfer to the AMF 308. This information includes N2 SM information (QoS information received from the hSMF 314, vUPF N3 tunnel information) and an SM NAS PDU Session Establishment Accept.

8) The AMF 308 sends an N2 PDU Session Request (which includes N2 SM information and an SM NAS message PDU Session Establishment Accept) to the RAN 304 (or other access network, if used).

9) The RAN 304 may issue AN specific signaling exchange with the device 302 that is related with the information received from the SMF. For example, in case of a 3GPP RAN, an RRC Connection Reconfiguration may take place with the UE, thereby establishing the necessary RAN resources related to the QoS Rules for the PDU Session request. In the case of N3IWF, an IKE Create Child SA procedure may take place with the device 302, thereby establishing Child SA related to each QoS flow for the PDU session.

10) The RAN 304 forwards the SM NAS message PDU Session Establishment Accept to the device 302. The RAN 304 also allocates RAN N3 tunnel information for the PDU Session.

11) The RAN 304 sends an N2 PDU Session Response to the AMF 308. This message includes the RAN N3 tunnel information of this PDU session.

12) The AMF 308 sends an Nsmf_PDUSession_UpdateSMContext Request to the vSMF 310. This message includes the RAN N3 tunnel information of this PDU session.

13) The vSMF 310 initiates an N4 Session Modification procedure with the vUPF 312. The vSMF 310 provides RAN N3 Tunnel Info to the vUPF 312 as well as the corresponding forwarding rules.

14) The vSMF 310 sends a Nsmf_PDUSession_UpdateSMContext Response to the AMF 308.

Figure 5:
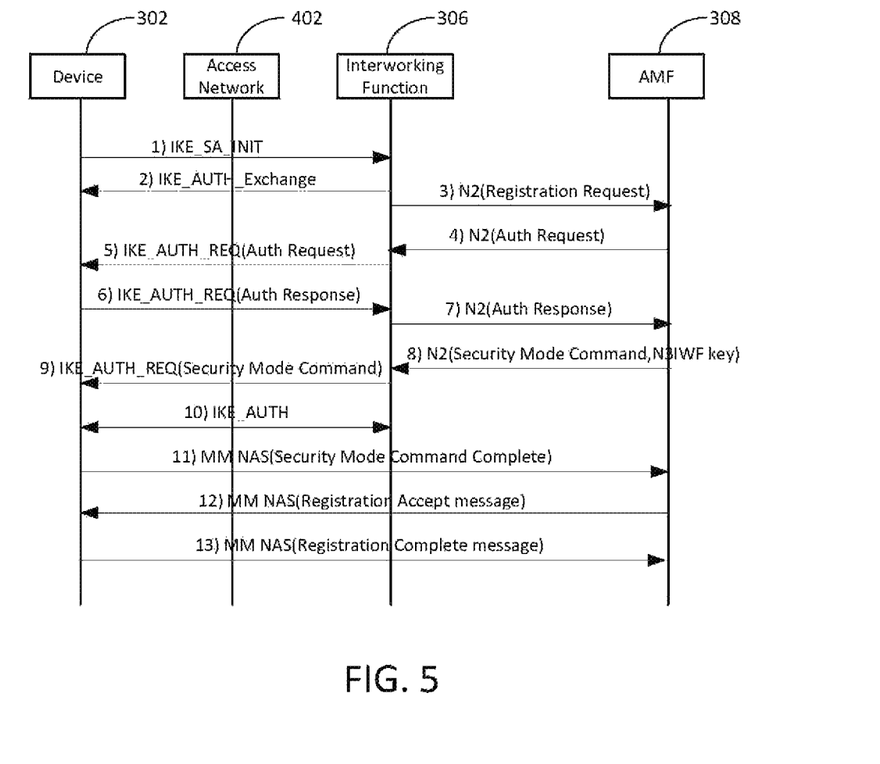
FIG. 5 depicts an existing procedure for a wireless communication device to carry out registration.

(((FIG. 5))) Turning to FIG. 5, an existing procedure for the communication device 302 to register via the interworking function 306 (e.g., an N3IWF) will now be described.

1) The device 302 connects to an untrusted access network (e.g., an untrusted non-3GPP access network, represented in FIG. 4 as access network 402). When the device 302 decides to attach to a untrusted network, the device selects an interworking function (such as an N3IWF of a 5G PLMN) (in this case the interworking function 306) and proceeds with the establishment of an IPsec Security Association ("SA") with the selected interworking function by initiating an IKE initial exchange.

2) The device 302 initiates an IKE_AUTH exchange procedure with the interworking function 306. During this procedure, the device 302 sends an MM NAS Registration Request message to the interworking function 306.

3) The interworking function 306 selects an AMF (AMF 308 in this case) and forwards the MM NAS Registration Request received from the device 302 to the selected AMF.

4) The AMF 308 may decide to authenticate the device 302. To do so, the AMF 308 sends an N2 message (NAS Authentication Request) to the interworking function 306.

5) The interworking function 306 forwards the NAS Authentication Request message to the device 302 via an IKE_AUTH Request 6) The device 302 calculates the Authentication result and sends a NAS Authentication Response to the interworking function 306 via an IKE_AUTH Response.

7) The interworking function 306 sends an N2 message (NAS Authentication Response) to the AMF 308. The AMF 308 checks whether the authentication is a success or not.

8) The AMF 308 sends a Security Mode Command (SMC) request to the device 302 in order to activate NAS security. This request is first sent to interworking function 306 (within an N2 message) together with the key (e.g., the N3IWF key).

9) The device 302 creates a NAS security context and a key (e.g., an N3IWF key).

10) The interworking function 306 exchanges an IKE_AUTH procedure with the device 302 to establish a signaling IPSec SA by using the common key (e.g., the common N3IWF key). After the establishment of the signaling IPsec SA, all NAS messages between the device 302 and the interworking function 306 are exchanged via this SA.

11) The device 302 sends a NAS Security Mode Command Complete to the AMF 308 via the signaling IPsec tunnel to the interworking function 306. The interworking function 306 forwards the NAS message to the AMF 308.

12) The AMF 308 sends an MM NAS Registration Accept to the device 302. This message includes the UE temporary Identity allocated by the AMF 308.

13) The device 302 stores the temporary Identity and sends the MM NAS Registration Complete to the AMF 308.

According to an embodiment, a communication network supports multiple accesses by a wireless communication device as follows. After a PDU session is established via a first access (e.g., via 3GPP access), an SMF (such as an hSMF) receives notification that the wireless communication device is registered over a second access (such as an untrusted non-3GPP access). The SMF establishes new QoS flows in the second access by sending a message to the AMF currently service the wireless communication device (including QoS information of the new QoS flow and information that these QoS flows are associated with the second access). The SMF also sends QoS rules of the new QoS flows to the wireless communication device via the first access.

Figure 6:
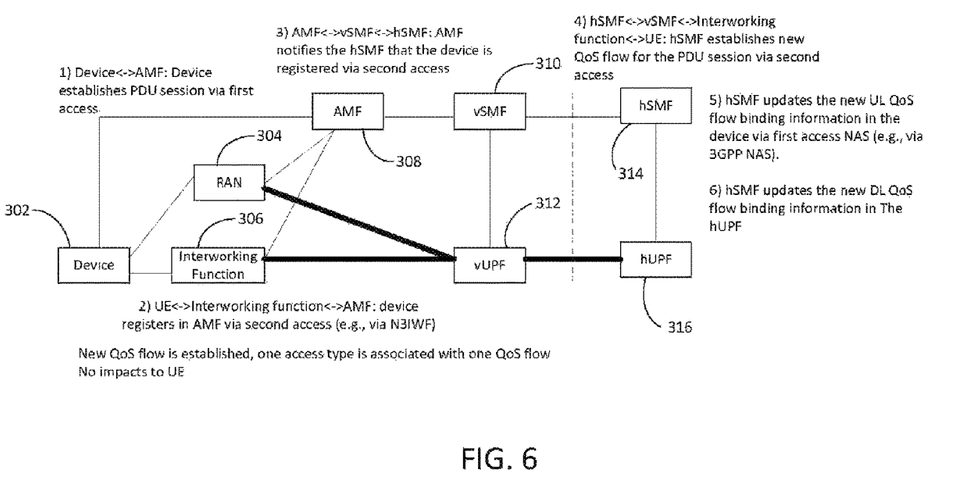
FIG. 6 depicts a general procedure for establishing a protocol data unit session over multiple accesses, according to an embodiment.

Turning to FIG. 6, a procedure for establishing a PDU session supporting both a first and a second access (e.g., a 3GPP access and a non-3GPP access) according to an embodiment will now be described. In this procedure, the hSMF 314 decides to establish new QoS flows over a second access (e.g., a non 3GPP access) so the device 302 and the UPF can route different QoS flows in the first and second accesses (e.g., different QoS flows in the 3GPP access and in the non-3GPP access), which reduces the impact on the UE side. The process generally occurs as follows.

1) Device 302<--->AMF 308: Device 302 establishes a PDU session via a first (e.g., 3GPP) access. 2) Device 302<--->interworking function 306<--->AMF 308: Device 302 registers with the AMF 308 via the interworking function 306 (e.g., via N3IWF). 3) AMF 308<--->vSMF 310<--->hSMF 314: the AMF 308 notifies the hSMF 314 that the device 302 is registered via the second access. 4) The hSMF 314<--->vSMF 310<--->interworking function 306<--->device 302: hSMF 314 establishes a new QoS flow for the PDU session via the interworking function 306. 5) The hSMF 314 updates the new uplink ("UL") QoS flow binding information in the device 302 via NAS of the first access (e.g., via 3GPP NAS). 6) The hSMF 314 updates the new downlink ("DL") QoS flow binding information in the hUPF 316.

In the procedure described in conjunction with FIG. 6, a new QoS flow is established, and one access type is associated with one QoS flow. There are no impacts to the device 302.

Figure 7:
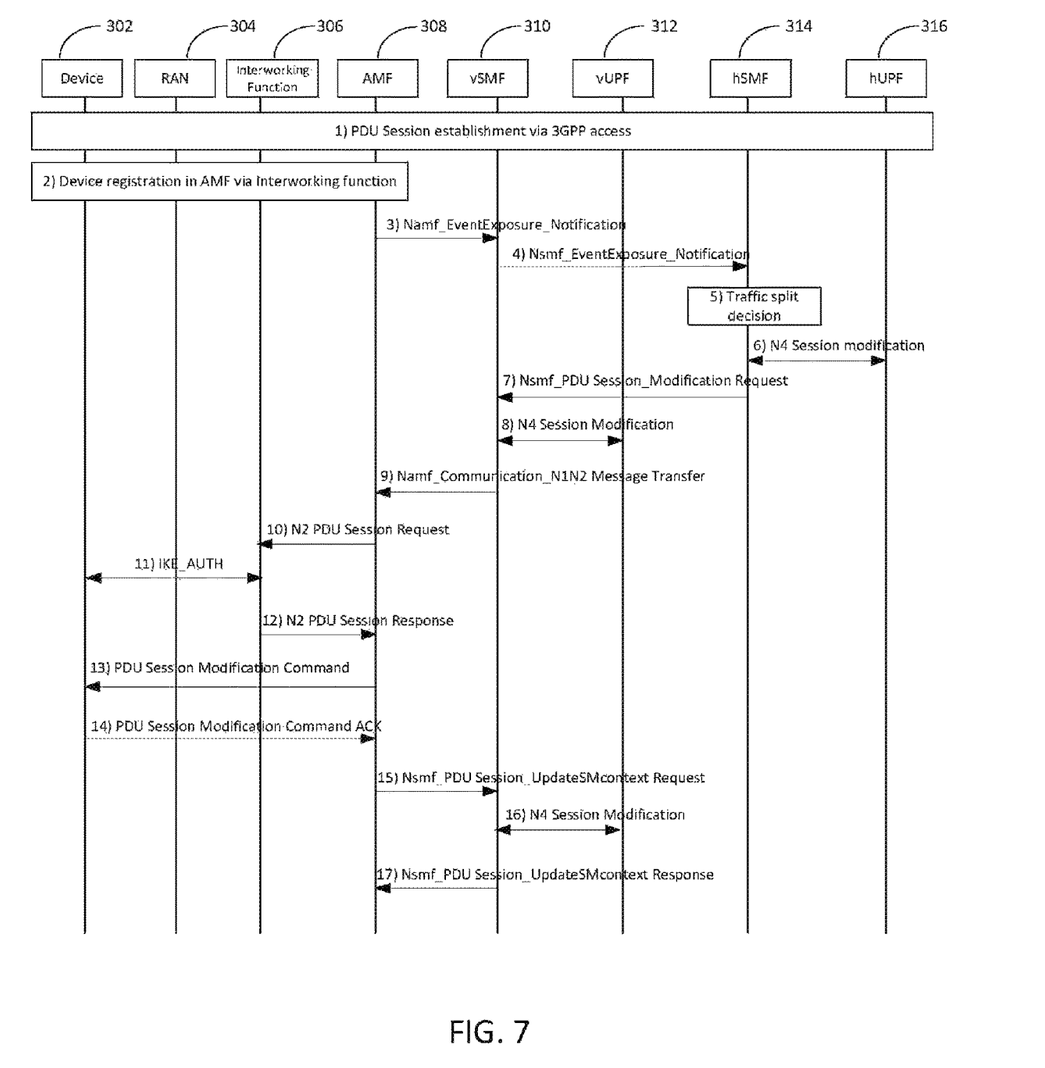
FIG. 7 depicts call flow for establishing a protocol data unit session over multiple accesses, according to an embodiment.

Turning to FIG. 7, a call flow according to an embodiment will now be described.

1) The device 302 establishes a PDU session via a first (e.g., 3GPP) access.

2) The device 302 performs a UE Registration procedure via the interworking function 306 (e.g., via the N3IWF) towards the AMF 308.

3) After a successful registration via the interworking function 306, the AMF 308 sends a Namf_EventExposure_Notification to the vSMF of the PDU session (the vSMF 310 in this case) to notify the vSMF that the device 302 is now available via a second access (e.g., via a non 3GPP access).

4) The vSMF 310 further notifies the hSMF 314 by sending a Nsmf_EventExposure_Notification about the availability of the device 302 in the second access (e.g., in the non 3GPP access).

5) The hSMF 314 may interact with policy control function ("PCF"). The PCF may indicate to the hSMF 314 that, for some service data flows, the second access (e.g., the non 3GPP access) is more suitable than the first access (e.g., the 3GPP access). In this case, the hSMF 314 may decide to establish new QoS flows in the second access for this PDU session. The hSMF 314 may make this decision according to its local policy without interaction with PCF. The following steps are performed to establish new QoS flows in the second (e.g., non 3GPP) access.

6) The hSMF 314 performs a N4 Session Modification procedure with the hUPF 316 and provides new Packet detection, enforcement and reporting rules to be installed on the hUPF 316 for the new QoS flows of this PDU Session.

7) The hSMF 314 sends an Nsmf_PDUSession_Modification Request message to the vSMF 310. This message includes QoS information of new QoS flows of this PDU session and information to indicate this new QoS flows are associated with the second access (e.g., the non 3GPP access).

8) The vSMF 310 initiates an N4 Session Modification procedure with the vUPF 312 to allocate a new vUPF N3 tunnel towards the interworking function 306 (e.g., the N3IWF).

9) The vSMF 310 sends a Namf_Communication_N1N2MessageTransfer to the AMF 308. This information includes N2 SM information (QoS information received from hSMF 314, vUPF N3 tunnel information), information that the N2 SM information should be sent towards the interworking function 306 (e.g., towards the N3IWF), and an SM NAS PDU Session Modification Command. The SM NAS PDU Session Modification Command message includes the QoS rules of the new QoS flow. The QoS rules identify the service data flows binding to the new QoS flow.

10) Based on the information that the N2 SM information should be sent towards the interworking function 306 the AMF 308 sends the N2 PDU Session Request (N2 SM information) to the interworking function 306.

11) The interworking function 306 initiates an IKE Create Child SA procedure with the device 302 to establish a Child SA related to each new QoS flow for the PDU session. The interworking function 306 also allocates N3 tunnel information for the PDU Session. The device 302 knows the new QoS flow is associated with non 3GPP access.

12) The interworking function 306 sends an N2 PDU Session Response to the AMF 308. This message includes the interworking function (e.g., N3IWF) N3 tunnel information of this PDU session.

13) The AMF 308 sends the SM NAS message PDU Session Modification Command received from the vSMF 310 to the device 302 via the first access (e.g., the 3GPP access). This step can be performed in parallel with step 10.

14) The device 302 stores the QoS rules and sends SM NAS message PDU Session Modification ACK to the AMF 308 via the first access (e.g., the 3GPP access).

15) After receiving a response from the interworking function 306, the AMF 308 sends a Nsmf_PDUSession_UpdateSMContext Request to the vSMF 310. This message includes the interworking function (e.g., N3IWF) N3 tunnel information of this PDU session.

16) The vSMF 310 initiates an N4 Session Modification procedure with the vUPF 312. The SMF provides interworking function (e.g., N3IWF) N3 Tunnel Info to the vUPF 312 as well as the corresponding forwarding rules of the new QoS flows.

17) The vSMF 310 sends an Nsmf_PDUSession_UpdateSMContext Response to the AMF 308.

In an embodiment, a communication network supports multiple accesses by a wireless communication device as follows. After a PDU session is established by the wireless communication device over a first access (e.g., a 3GPP access), an SMF receive notification that the device is registered over a second access (e.g., a non-3GPP access). The SMF modifies the existing QoS flows so that they become associated with the second access. The SMF accomplishes this by sending a message to the AMF, including QoS information of the existing QoS flows and information that indicates that QoS information for these QoS flows should be sent towards the interworking function 306 (e.g., towards the N3IWF). The SMF then informs the wireless communication device that the existing QoS flows are now associated with the second access.

Figure 8:
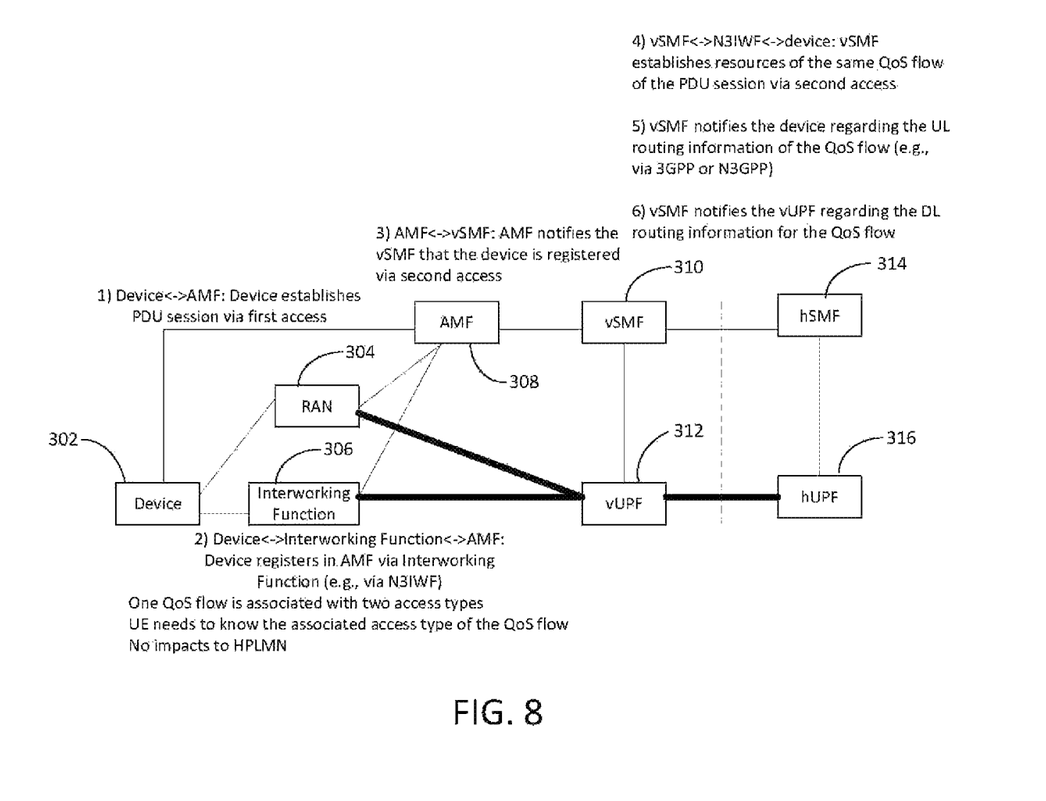
FIG. 8 depicts a general procedure for establishing a protocol data unit session over multiple accesses, according to another embodiment.

Turning to FIG. 8, a procedure for establishing a PDU session supporting both a first and a second access (e.g., a 3GPP access and a non-3GPP access) according to an embodiment will now be described. In this procedure, the vSMF 310 decides to associate the old QoS flows with the second access (e.g., with the non 3GPP access). The vSMF 310 needs to notify the device 302 and the vUPF 312 which access the QoS flows are associated with. There is no impact on hSMF 314 and the hUPF 316. The process generally occurs as follows.

1) Device 302<--->AMF 308: Device 302 establishes a PDU session via a first access (e.g., a 3GPP access). 2) Device 302<--->interworking function 306<--->AMF 308: Device 302 registers with the AMF 308 via the interworking function 306 (e.g., via N3IWF). 3) AMF 308<--->vSMF 310: The AMF 308 notifies the vSMF 310 that the device 302 is registered via the second access (e.g., via non-3GPP access). 4) The vSMF 310<--->interworking function 306<--->device 302: The vSMF 310 decides that some existing QoS flows should go via the second access and establishes resources for these QoS flows of the PDU session via the interworking function 306. 5) The vSMF 310 notifies the device 302 regarding the UL routing information of the QoS flows (via the first access or via the second access (e.g., via 3GPP or via Non-3GPP)). 6) The vSMF 310 notifies the vUPF 312 regarding the DL routing information for the QoS flows.

In the procedure described in conjunction with FIG. 8, one QoS flow is associated with two access types. The device 302 needs to know the associated access type of the QoS flow. There are no impacts to HPLMN.

Figure 9:
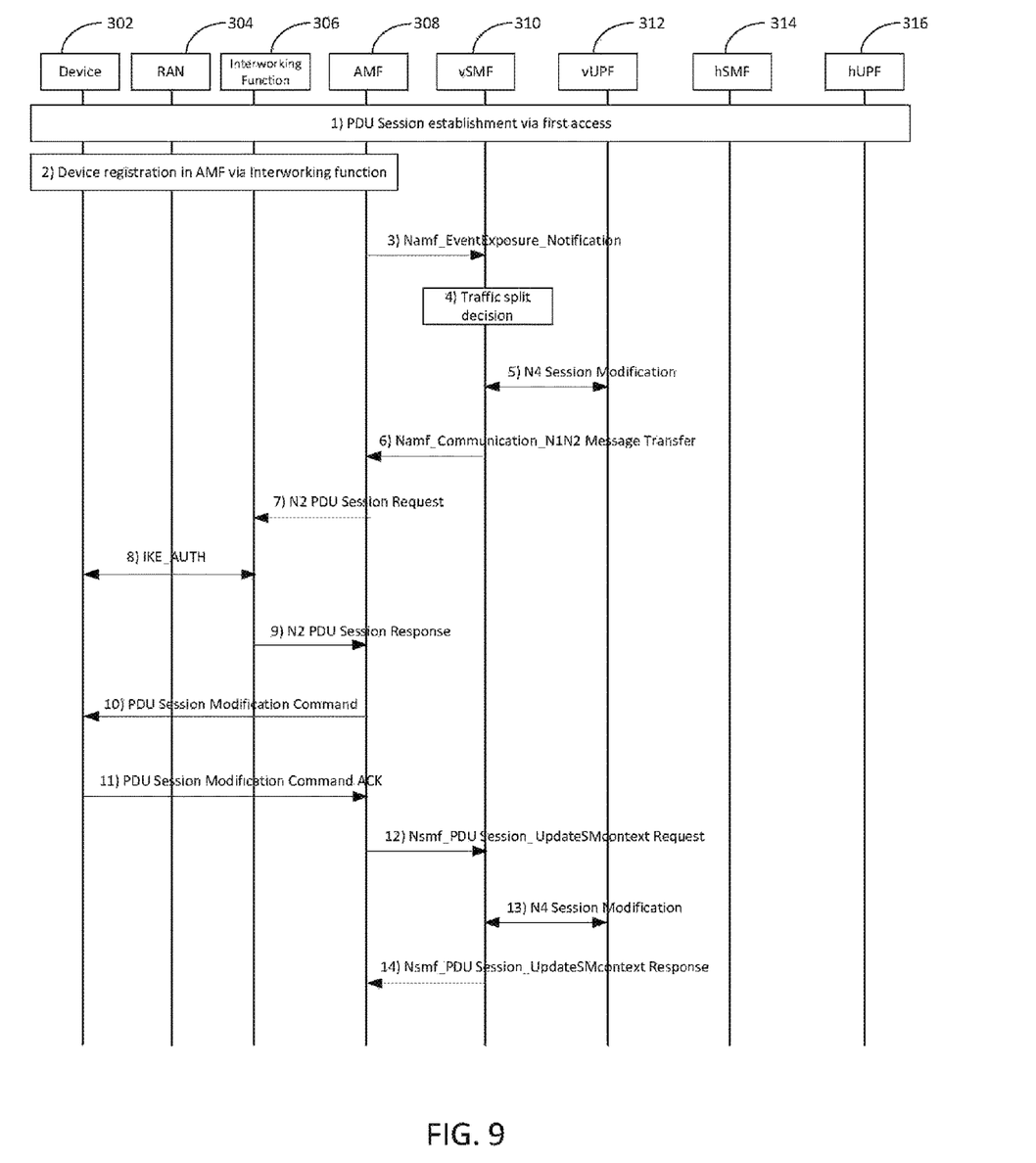
FIG. 9 depicts call flow for establishing a protocol data unit session over multiple accesses, according to another embodiment.

Turning to FIG. 9, a call flow according to an embodiment will now be described.

1) The device 302 establishes a PDU session via 3GPP access.

2) The device 302 performs a Registration procedure via the interworking function 306 towards the AMF 308.

3) After successful registration via the interworking function 306, the AMF 308 sends a Namf_EventExposure_Notification to the vSMF 310 of the PDU session to notify it that the UE is now available via the second access (e.g., via the non 3GPP access).

4) The vSMF 310 determines that, for some QoS flows, the second access (e.g., the non 3GPP access) is more suitable than the first access (e.g., the 3GPP access). In this case, the vSMF 310 may associate these QoS flows with the second access. The following steps are carried to associate existing QoS flows with the second access.

5) The vSMF 310 initiates an N4 Session Modification procedure with the vUPF 312 to allocate a new vUPF N3 tunnel towards the interworking function 306.

6) The vSMF 310 sends a Namf_Communication_N1N2MessageTransfer to the AMF 308. This information includes N2 SM information (QoS information of the QoS flows, vUPF N3 tunnel information), information that the N2 SM information should be sent towards the interworking function 306, and an SM NAS PDU Session Modification Command. The SM NAS PDU Session Modification Command message includes information about the access type associated with the QoS flows.

7) Based on the information that the N2 SM information should be sent towards the interworking function 306, the AMF sends an N2 PDU Session Request (including N2 SM information) to the interworking function 306.

8) The interworking function 306 initiates an IKE Create Child SA procedure with the device 302 to establish a Child SA related to each QoS flows for the PDU session. The interworking function 306 also allocates N3 tunnel information for the PDU Session.

9) The interworking function 306 sends an N2 PDU Session Response to the AMF 308. This message includes the interworking function (e.g., N3IWK) N3 tunnel information of this PDU session.

10) The AMF 308 sends the SM NAS message PDU Session Modification Command to the device 302 via the first access (e.g., via the 3GPP access). This step can be performed in parallel with step 7.

11) The device 302 stores the information about the access type associated with the QoS flows and sends an SM NAS message PDU Session Modification ACK to the AMF 308 via the first access (e.g., via the 3GPP access). From this step, the device 302 associates the identified QoS flows with the second access (e.g., with non 3GPP access).

12) After receiving response from the interworking function 306, the AMF 308 sends a Nsmf_PDUSession_UpdateSMContext Request to the vSMF 310. This message includes the N3IWF N3 tunnel information of this PDU session.

13) The vSMF 310 initiates an N4 Session Modification procedure with the vUPF 312. The vSMF 310 provides interworking function (e.g., N3IWF) N3 Tunnel Info to the vUPF 312 as well as the corresponding forwarding rules of the new QoS flows.

14) The vSMF 310 sends Nsmf_PDUSession_UpdateSMContext Response to the AMF 308.

In an embodiment, from the point of view of the device 302, establishing a multiple accesses involves the following actions. The device 302 establishes a PDU session over a first access (such as a 3GPP access), carries out a registration over a second access (such as a non-3GPP access), receives the associated access type of the QoS flow from an SMF over first access, and delivers UL traffic of the QoS flow over the associated access.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

From the foregoing, it will be appreciated that specific embodiments of the disclosed technology have been described herein for purposes of illustration and that various modifications can be made without being limited to those specific embodiments.

What is claimed is:

1. A wireless communication method, comprising:
receiving, by a first computing device, a notification that a wireless communication device that has previously established a protocol data unit session via a first network access has registered for a second network access; and
establishing, by the first computing device, one or more quality of service (QoS) flows for the protocol data unit session for the wireless communication device over the second network access by transmitting, from the first computing device to a second computing device, a message that includes information to associate the one or more quality of service (QoS) flows with the second network access, and
wherein the first computing device is configured to carry out a session management function and the second computing device is configured to carry out an access and mobility management function.

2. The method of claim 1, wherein the receiving the notification comprises receiving the notification from the second computing device.

3. The method of claim 1, wherein the receiving the notification comprises:
receiving the notification from a third computing device via the second computing device,
wherein the session management function carried out by the first computing device corresponds to a home session management function and the third computing device is configured to carry out a visiting session management function.

4. The method of claim 1, wherein the transmitting the message comprises:
transmitting the message to the second computing device via a third computing device,
wherein the session management function carried out by the first computing device corresponds to a home session management function and the third computing device is configured to carry out a visiting session management function.

5. The method of claim 1, further comprising:
determining, by the first computing device, based on a policy control function, that at least one of the one or more quality of service (QoS) flows is associated with the second network access.

6. The method of claim 1, further comprising:
determining, by the first computing device, without reference to a policy control function, that at least one of the one or more quality of service (QoS) flows is associated with the second network access.

7. The method of claim 1, wherein the first network access is via a first type of a communication network and the second network access is via a second type of the communication network.

8. The method of claim 7, wherein the first type of the communication network is a cellular network and the second type of the communication network is a wireless local area network.

9. A wireless communication method, comprising:
receiving, by a first computing device, a notification that a wireless communication device that has previously established a protocol data unit session via a first network access has registered for a second network access;
modifying, by the first computing device, one or more quality of service (QoS) flows for the protocol data unit session to associate the one or more quality of service (QoS) flows with the second network access by transmitting, from the first computing device to a second computing device, a message that includes information to associate the one or more quality of service (QoS) flows with the second network access, wherein the first computing device is configured to carry out a session management function and the second computing device is configured to carry out an access and mobility management function.

10. The method of claim 9, wherein the receiving the notification comprises receiving the notification from the second computing device.

11. The method of claim 9, wherein the message includes information regarding a type of network access that the one or more quality of service (QoS) flows are to be associated with.

12. The method of claim 9, further comprising:
notifying the wireless communication device regarding a type of network access that the one or more quality of service (QoS) flows are to be associated with.

13. The method of claim 9, wherein the first network access is via a first type of a communication network and the second network access is via a second type of the communication network.

14. The method of claim 13, wherein the first type of the communication network is a cellular network and the second type of the communication network is a wireless local area network.

15. A wireless communication method carried out by a wireless communication device, the method comprising:
establishing a protocol data unit session over a first network access by sending a request for the protocol data unit session to a first computing device configured to carry out a session management function;
registering for a second network access;
receiving quality of service (QoS) information for the second network access via the first network access; and
transmitting an uplink data traffic via the second network access using the received quality of service (QoS) information, and
wherein the receiving quality of service (QoS) information comprises receiving quality of service (QoS) information for the second network access from the first computing device carrying out a session management function via a second computing device configured to carry out an access management function.

16. The method of claim 15, wherein the first network access is via a first type of a communication network and the second network access is via a second type of the communication network.

* * * * *